Patented July 12, 1932

1,867,106

UNITED STATES PATENT OFFICE

ALBERT SCHMELZER, FRITZ BALLAUF, AND HEINRICH HEFNER, OF ELBERFELD, GERMANY, ASSIGNORS, BY MESNE ASSIGNMENTS, TO GENERAL ANILINE WORKS, INC., OF NEW YORK, N. Y., A CORPORATION OF DELAWARE

HYDROXY-BENZOCARBAZOLE-CARBOXYLIC ACIDS

No Drawing. Application filed January 30, 1930, Serial No. 424,734, and in Germany February 8, 1929.

The present invention relates to new hydroxy-carboxylic acids of benzocarbazoles, more particularly it relates to compounds of the general formula:

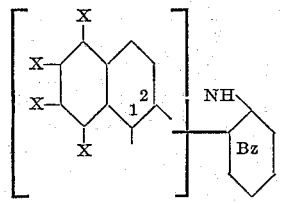

wherein the heterocyclic nucleus is attached to the naphthalene nucleus in 1.2-position, one X stands for a hydroxy group, one X stands for a carboxylic group and the other X's stand for hydrogen and wherein the benzene nucleus Bz may be substituted, for example by alkyl, halogen, the nitro group.

Our new compounds are obtainable by causing carbon dioxide to act on a hydroxy-benzocarbazole of the general formula:

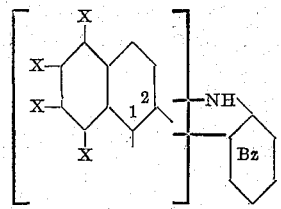

wherein the heterocyclic nucleus is attached to the naphthalene nucleus in 1.2-position, one X stands for a hydroxy group, the other X's stand for hydrogen and wherein the benzene nucleus Bz may be substituted, for example by alkyl, halogen, the nitro group, at elevated temperature and superatmospheric pressure in the presence of an alkali- hydroxide, -bicarbonate or -carbonate. The temperature and the pressure used may be varied in the widest limits, temperatures between about 100–300° C. and superatmospheric pressures quite generally have been found to be suitable, favorably the process is carried out at temperatures between about 150–250° C. and a carbon-dioxide pressure between about 5–40 atmospheres. The quantity of the alkali to be added to the hydroxy-benzocarbazole may range on a large scale, but in order to complete the reaction at least such a quantity must be present that the alkali metal salt of the hydroxy-benzocarbazole can form, that will say, in case alkali metal hydroxides and -carbonates molecular quantities are used, while in the case of bicarbonates a double molecular quantity is added. During the reaction the pressure continuously decreases, and the process is complete when the pressure remains unchanged, say after about 20 hours, the time required depending on the specific temperatures and pressures used.

Instead of starting with a mixture of a hydroxy-benzocarbazole and an alkali metal-hydroxide, -carbonate or -bicarbonate, there may be started with an alkali metal salt of a hydroxy-benzocarbazole, which process is equivalent to that heretofore described.

The new hydroxy-carboxylic acids of benzocarbazoles are yellowish or greyish to greenish substances of high melting points and are insoluble in water, soluble in alcohol. They are valuable intermediate substances for the manufacture of dyestuffs and therapeutical agents.

The invention is illustrated by the following examples, without being limited thereto:

*Example 1.*—115 parts by weight of 4-hydroxy-α-benzocarbazole (obtainable by heating 1-naphthylamine-5-sulfonic acid with phenylhydrazine and sodium bisulfite, heating the resulting product with dilute hydrochloric acid and melting with sodium hydroxide), are finely ground with 350 parts by weight of potassium bicarbonate and placed in an autoclave with the addition of glass beads. Carbon dioxide is then forced in, and the vessel is maintained for 10 hours at 220–240° C. and 40 atmospheres pressure. After cooling the reaction product is dissolved in water, filtered, and the solution is acidified. The 4-hydroxy-α-benzocarbazole carboxylic acid separates as a yellowish colored mass. It is filtered wtih suction, washed with water and dried. It does not give a blue reaction with ferric chloride and is therefore probably not an o-hydroxy carboxylic acid. It has the following formula:

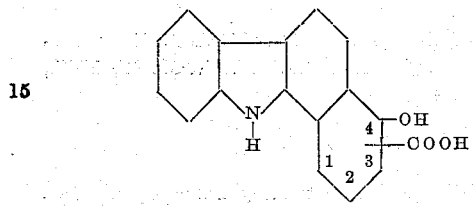

*Example 2.*—115 parts by weight of 4-hydroxy-γ-benzocarbazole (obtainable by heating 2-naphthylamine-5-sulfonic acid with phenylhydrazine and sodium bisulfite, heating the resulting product with dilute hydrocholric acid and melting with sodium hydroxide), are finely ground with 350 parts by weight of potassium carbonate and placed in an autoclave with the addition of glass beads. Carbondioxide then forced in, and the vessel is maintained for 10 hours at 210–220° C. and 40 atmospheres pressure. After cooling the reaction product is dissolved in water, filtered, and the solution is acidified. The 4-hydroxy-γ-benzocarbazole carboxylic acid separates as a yellowish colored mass. It is filtered with suction, washed with water and dried. It does not give a blue reaction with ferric chloride and is therefore not an o-hydroxy carboxylic acid. It is readily soluble in alcohol and melts at 220° C. It has the following formula:

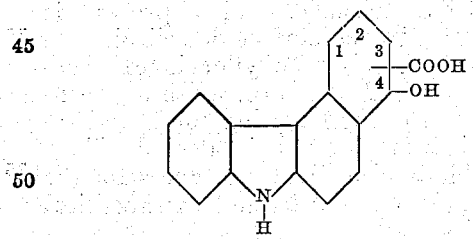

*Example 3.*—115 parts by weight of 3-hydroxy-α-benzocarbazole obtainable in an analogous manner as the 4-hydroxy-α-benzocarbazole, and when recrystallized from diluted alcohol showing the melting point of 247° C., are treated as described in Example 1. The resulting 3-hydroxy-α-benzocarbazole carboxylic acid has the same properties as the acid obtainable according to Example 1.

*Example 4.*—115 parts by weight of 2-hydroxy-α-benzocarbazole, showing the melting point of 248° C. when recrystallized from diluted alcohol, are treated in the same manner as described in Example 1. The resulting hydroxy-carboxylic acid of the formula:

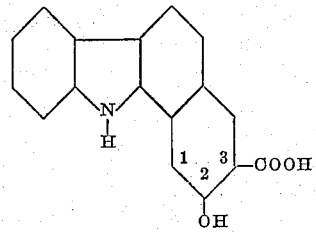

gives the typical blue reaction with ferric chloride. It is therefore an o-hydroxy-carboxylic acid and has in contradistinction to the acids according to Examples 1 and 3 a greenish-yellow color. Its melting point lies above 300° C. The 2-hydroxy-α-benzocarbazole-3-carboxylic acid has a strong effect upon the naso-mucuous membrane.

We claim:

1. As new products hydroxy-benzocarbazole carboxylic acids of the probable general formula:

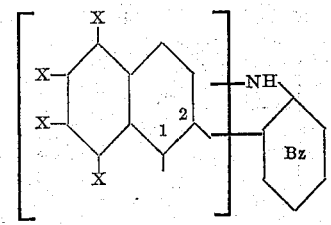

wherein the heterocyclic nucleus is attached to the naphthalene nucleus in 1.2-position, one X stands for a hydroxy group, one X stands for a carboxylic acid group and the other X's stand for hydrogen, being generally yellowish or greyish to greenish substances of high melting points, insoluble in water, soluble in alcohol, and being valuable intermediate substances for the manufacture of dyestuffs and therapeutical agents.

2. As new products hydroxy-benzocarbazole carboxylic acids of the probable general formula:

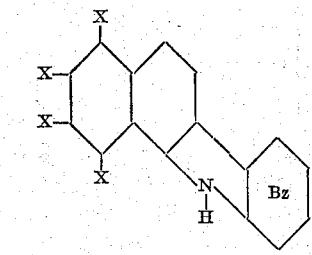

wherein one X stands for a hydroxy group, one X stands for a carboxylic acid group and the other X's stand for hydrogen, being generally yellowish or greyish to greenish substances of high melting points, insoluble in water, soluble in alcohol and being valuable intermediate substances for the manufacture of dyestuffs and therapeutical agents.

3. As a new product 2-hydroxy-α-benzocarbazole-3-carboxylic acid of the probable formula:
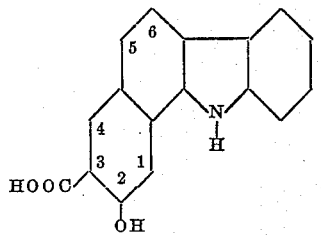
being a greenish-yellow substance, having a melting point of above 300° C.
In testimony whereof, we affix our signatures.
ALBERT SCHMELZER.
FRITZ BALLAUF.
HEINRICH HEFNER.